Figures 3, 4:
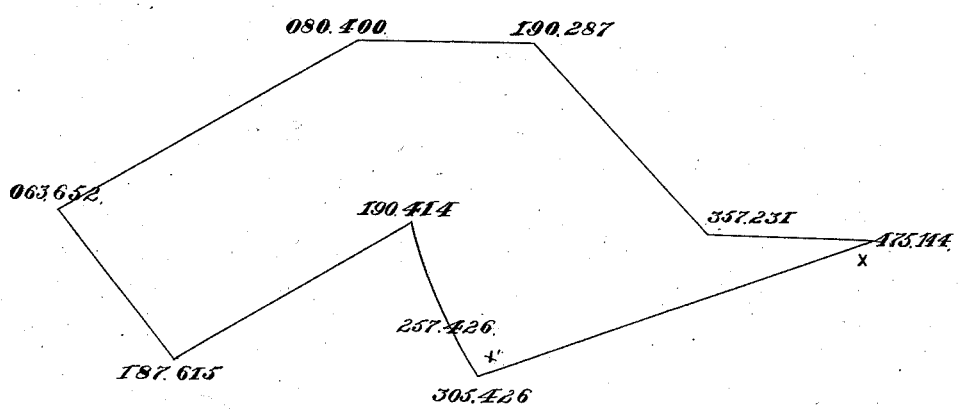

J. M. WOLBRECHT.  
Instrument for Transmitting Diagrams.
No. 201,473.   Patented March 19, 1878.
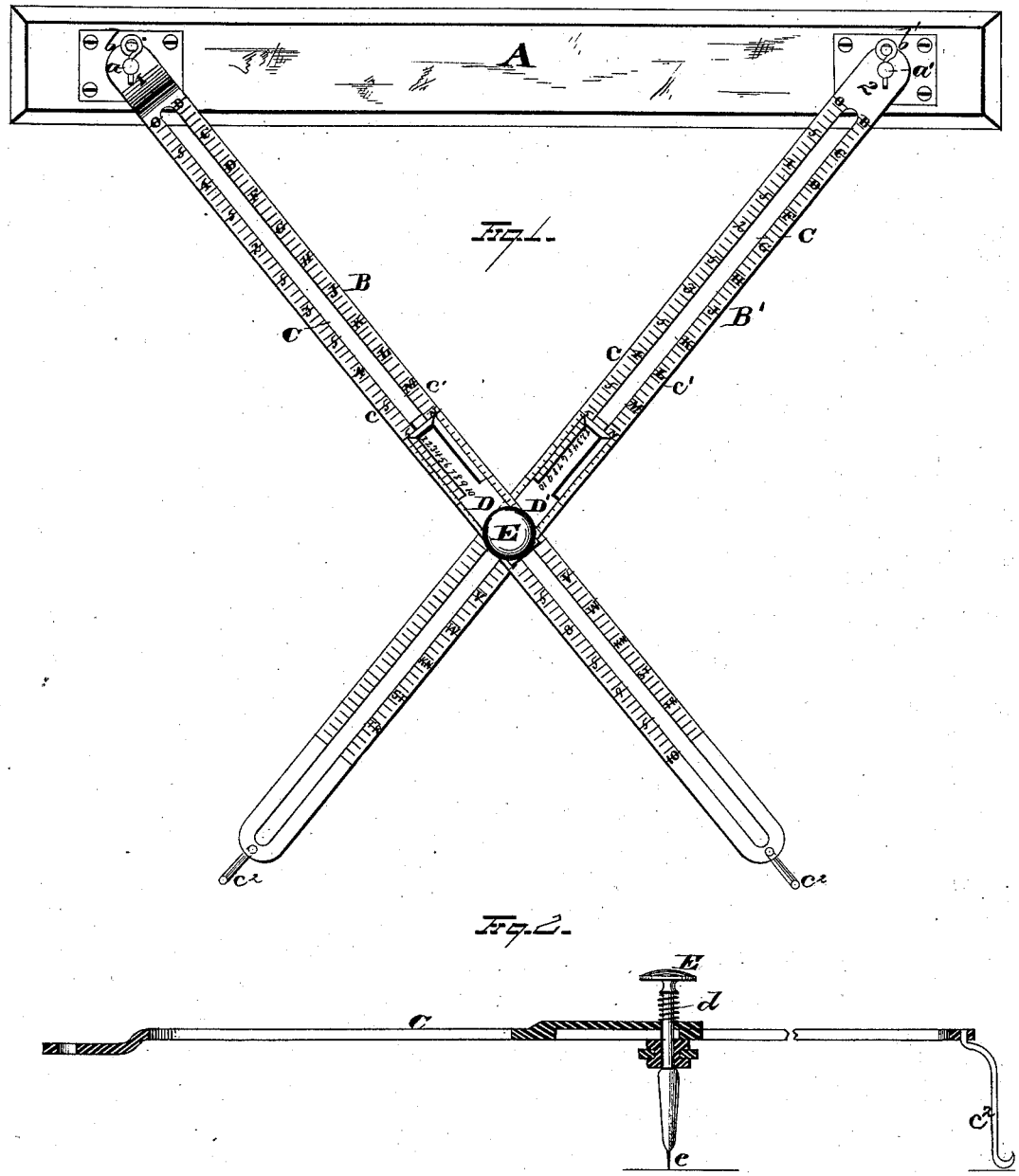

3 Sheets—Sheet 2.

J. M. WOLBRECHT.
Instrument for Transmitting Diagrams.

No. 201,473. Patented March 19, 1878.

WITNESSES
Ed. F. Nottingham
A. W. Bright.

INVENTOR
John M. Wolbrecht,
By H. A. Seymour.
ATTORNEY

J. M. WOLBRECHT.
Instrument for Transmitting Diagrams.
No. 201,473. Patented March 19, 1878.
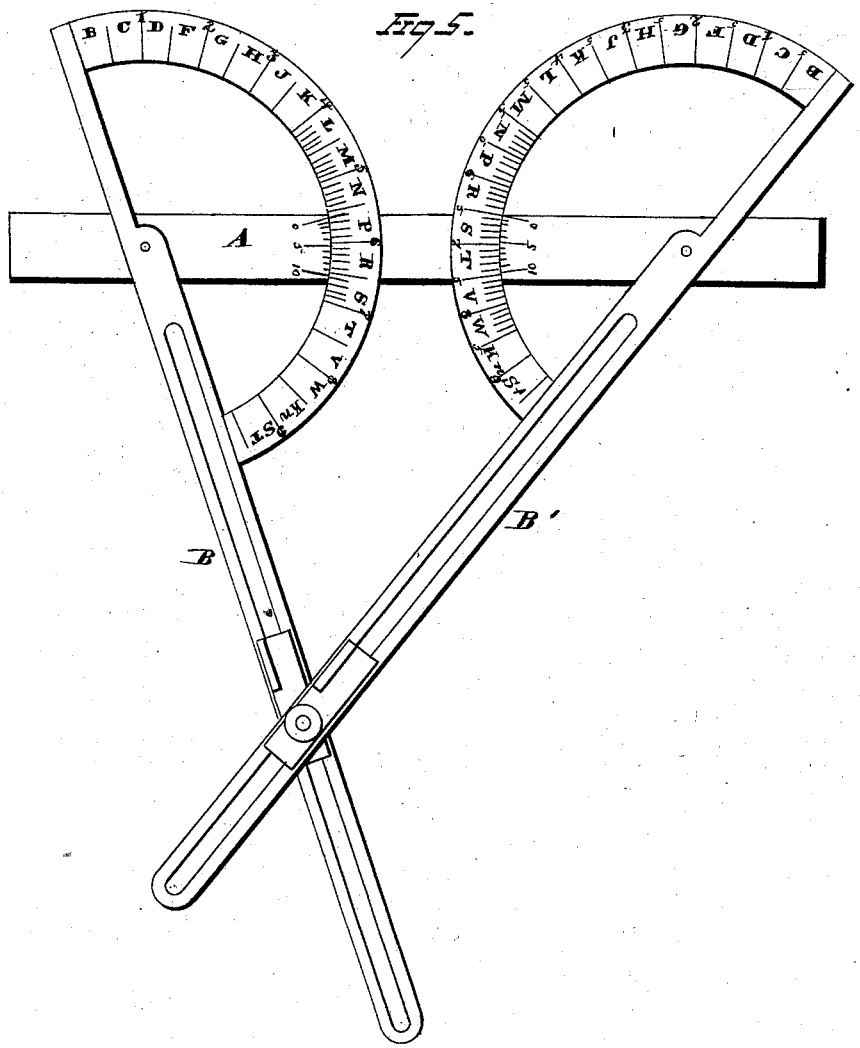
WITNESSES
INVENTOR
John M. Wolbrecht
By H. A. Seymour
ATTORNEY

UNITED STATES PATENT OFFICE.

JOHN M. WOLBRECHT, OF WASHINGTON, DISTRICT OF COLUMBIA, ASSIGNOR TO JOHN SHERMAN AND WILLIAM T. HOTCHKISS, OF SAME PLACE.

IMPROVEMENT IN INSTRUMENTS FOR TRANSMITTING DIAGRAMS.

Specification forming part of Letters Patent No. 201,473, dated March 19, 1878; application filed October 13, 1877.

*To all whom it may concern:*

Be it known that I, JOHN M. WOLBRECHT, of Washington, District of Columbia, have invented certain new and useful Improvements in System and Instrument for Transmitting Diagrams by Telegraph; and I do hereby declare the following to be a full, clear, and exact description of the invention, such as will enable others skilled in the art to which it pertains to make and use it, reference being had to the accompanying drawings, which form part of this specification.

My invention relates to an improved system and instrument for copying and transmitting diagrams.

Heretofore it has been practically impossible to transmit accurate angles and measurements of diagrams by telegraph; and the object of my invention is to provide a system and instruments whereby the several angles of the most complex diagrams can be readily and accurately copied in a form to admit of transmission by telegraph.

In the accompanying drawings, Figure 1 represents a plan view of my improved instrument for calculating the measurements of the angles of a diagram. Fig. 2 is a vertical section taken through one of the graduated bars. Fig. 3 illustrates a diagram wherein the several angles are designated by the proper combination of figures, which, when forwarded in groups by telegraph to any distant station, enable the correspondent at the receiving-station to readily ascertain the exact angles of the diagram by adjusting his instrument according to the figures of the telegram received, and thus enable him to reproduce an accurate fac-simile of the diagram at the sending-station. Fig. 4 represents a similar diagram, wherein the angles are represented by letters, which may be arranged in words to constitute a cipher message for transmitting the desired information. Fig. 5 is a modification.

A represents a bed-plate, which may be constructed of any desired material. In the present example, the bed-plate A is provided at either end with vertical pins or posts $a$ $a'$, to which are pivoted the graduated bars B B', the same being removably secured to said posts by means of locking-pins $b$ $b'$. The outer ends of the graduated bars B B' are supported by loosely-pivoted legs $c^2$, that the bars may be readily moved in any direction without danger of tearing or otherwise injuring the diagram on which it is placed.

It is evident that light casters may be employed in lieu of the legs or supports $b$, and equally good results secured thereby.

Each graduated bar is formed with a central slot, C, extending nearly the entire length of the bar, which divides each bar into two sections, $c$ $c^1$. Each section $c$ $c^1$ is provided with a graduated scale, denoting inches and tenths of inches.

One of the sections of each bar—as, for instance, section $c$—has the inches denoted by figures running from 1 to 10, and each inch is subdivided into tenths. The opposite sections $c^1$ of each bar are likewise subdivided into inches and tenths, each half-inch being designated by letters, consonants being preferably used, while the fractional parts of each half-inch are designated by the five vowels.

Upon each of the graduated bars B B' are placed the verniers D D', the same being arranged to slide freely on the bars B B'. Through the ends of the verniers D D' extends a pencil-holder or indicator, E, the point of which is kept above the paper by means of a spiral or other spring, $d$.

It will be readily understood from the above description that when the bed-plate is located in any desired position on the sheet of paper the marking-point $e$ may be readily moved to any desired locality on the sheet, and, when in the exact position desired, the pencil is depressed, thus indicating the outline of the diagram by a series of dots, which designate the angle of the diagram.

My improved system and instrument for transmitting diagrams will be more clearly understood by referring to Fig. 3. Assuming that it is desired to transmit by telegraph to a distant station a fac-simile of the diagram represented in Fig. 3, the sender places an instrument similar to the one illustrated in Figs. 1 and 2 over the diagram, and moves the indicator or pencil to the point designated by the letter $x$. The vernier on the left-hand graduated bar indicates a measurement of four hundred and seventy-five one-hundredths inches, while the vernier on the right-hand graduated bar indicates a measurement of one hundred and forty-four one-hundredths inches. These measurements are represented by the figures 475, 144. The indicating-point is then moved to the angle at $x'$, and when the pencil rests upon said point $x'$, the left-hand bar will register 305, while the right-hand bar will register 426.

Proceeding in this manner along the entire outline of the diagram, and properly indicating every angle therein by the proper figures on the graduated bars and verniers, it will enable the several angles to be forwarded to a distant station by means of a message made up of the different groups of figures designating the various angles of the diagram.

At the receiving-station the receiver of the message places an exact duplicate of the instrument employed by the sender on a sheet of paper, and adjusts the graduated bars until the slide or vernier of the left and right hand graduated bars respectively register 475, 144, and the pencil is then depressed to form a dot at that point. Then the pencil is moved until the verniers register 305, 426, and the paper is again marked by the pencil. In the same manner the several angles of the diagrams are soon determined. By connecting the several dots formed by the indicator there will be reproduced a fac-simile of the diagram in the hands of the sender.

Instead of employing figures to transmit the message, cipher telegrams may be used with equally accurate results. As heretofore stated, each half-inch on both graduated bars is represented by a consonant, while the fifths of each half-inch are represented by the five vowels.

Referring to Fig. 4, when the indicator is placed on the point $y$ the vernier on the left-hand bar will be located a little below the letter "J," which letter will stand for the first letter of the word. The fifths are then counted from the letter "J" in the order of the five vowels, and it is found that the fraction of the inch is represented by the vowel "u," which letter constitutes the second letter of the word. Any additional letters may be added to the letters "Ju" to constitute a complete word—as, for instance, the word "Jute."

The right-hand bar is, in the same manner, represented by the letters "Fe," and by adding the letter "n" we have the word "Fen."

Whenever any fraction of an inch less than one-tenth is to be denoted in the message, it is designated by a word of two syllables—as, for instance, the vernier-register "Pa," and also a fraction of an inch less than one-tenth. In such case the word is formed of two syllables, as "Panting;" or the same result can be obtained if, instead of having the slotted bars B B' graduated to measure the distances to the point, arcs are graduated and attached to the instrument for the purpose of measuring the angles in similar characters, as shown in Fig. 5; or one graduated bar and one graduated arc may be used—in fact, any arrangement for measuring the co-ordinates of points and designating them by groups of figures or letters.

From the foregoing it will be understood that a concise and accurate description of the entire contour of a diagram may be condensed into a telegram made up either of figures or words, and the same, when received at the receiving-station, may be readily portrayed by the employment of an instrument in duplicate of the one used by the sender.

It is evident that the instrument may be greatly varied in the details of its construction and arrangement of parts without departing from the spirit of our invention; also, any desired system of designating the different angles of a diagram may be employed, as I do not confine myself to the exact formula herein set forth.

My improvement is adapted for the purpose of forwarding by telegraph a complete outline of any desired diagram that is desired to be quickly forwarded from one point to another distant point.

Having fully described my invention, what I claim as new, and desire to secure by Letters Patent, is—

1. The method, substantially as hereinbefore set forth, of copying and transmitting diagrams, the same consisting, essentially, in designating the several angles of the diagram by the words or figures indicated on a measuring-instrument, and then transmitting this transcript, made up of as many groups of such figures or words as there are angles to be transmitted, and translating the message at the receiving-station by means of an instrument in duplicate of the one employed by the sender, substantially as set forth.

2. The combination, with a bed-plate, of the intersecting graduated bars, the intersecting verniers, and the indicator located at the point of intersection of the graduated bars, substantially as set forth.

3. The combination, with the bed-plate and intersecting graduated bars pivoted thereto, of the verniers and the indicator upheld by a spring, substantially as set forth.

4. The combination, with a bed-plate, of the intersecting graduated bars pivoted thereto, and movable supports attached to the free ends of said graduated bars, substantially as set forth.

In testimony that I claim the foregoing I have hereunto set my hand this 9th day of October, 1877.

JOHN M. WOLBRECHT.

Witnesses:
ROBERT D. MESTON,
W. T. HOTCHKISS.